US008214612B1

(12) United States Patent
Natanzon

(10) Patent No.: US 8,214,612 B1
(45) Date of Patent: Jul. 3, 2012

(54) ENSURING CONSISTENCY OF REPLICATED VOLUMES

(75) Inventor: Assaf Natanzon, Ramat-Gan (IL)

(73) Assignee: EMC Corporation, Hopkinton, MA (US)

( * ) Notice: Subject to any disclaimer, the term of this patent is extended or adjusted under 35 U.S.C. 154(b) by 390 days.

(21) Appl. No.: 12/568,203

(22) Filed: Sep. 28, 2009

(51) Int. Cl.
*G06F 12/16* (2006.01)
(52) U.S. Cl. .......................... 711/162; 711/114; 707/622
(58) Field of Classification Search .................. None
See application file for complete search history.

(56) References Cited

U.S. PATENT DOCUMENTS

| | | | | |
|---|---|---|---|---|
| 5,592,618 A * | 1/1997 | Micka et al. | ..................... | 714/54 |
| 6,085,298 A * | 7/2000 | Ohran | ........................... | 711/162 |
| 7,809,898 B1 * | 10/2010 | Kiselev et al. | ................ | 711/152 |
| 7,882,286 B1 * | 2/2011 | Natanzon et al. | ............... | 710/74 |
| 8,051,288 B2 * | 11/2011 | Garg et al. | ..................... | 713/170 |
| 2005/0193272 A1 * | 9/2005 | Stager et al. | ..................... | 714/42 |
| 2006/0218365 A1 * | 9/2006 | Osaki et al. | ..................... | 711/162 |
| 2007/0130216 A1 * | 6/2007 | Wolfgang et al. | ............. | 707/201 |
| 2008/0147756 A1 * | 6/2008 | Stager et al. | .................. | 707/204 |

* cited by examiner

*Primary Examiner* — Kaushikkumar Patel
(74) *Attorney, Agent, or Firm* — Krishnendu Gupta; Joseph D'Angelo

(57) ABSTRACT

A method, system, and program product for ensuring consistency of dynamically changing volumes comprising creating a production change map for a first volume; wherein the production change map is marked to represent pending IO, creating a replication change map for a second volume; wherein the replication change map is marked to represent pending IO, transferring a first signature corresponding to a portion of the first volume to the replication volume, wherein the signature does not include the portion marked as pending IO in the production change map, comparing the first signature to a second signature, the second signature corresponding to a portion of the replication volume corresponding to the portion of the production volume; wherein portions marked as dirty in the replication change map are not included in the signature.

20 Claims, 19 Drawing Sheets

JOURNAL VOLUME SEGMENTS AT STAGE 2

| BLOCK No. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| SEGMENT #1 | | | | | | | | | | | | | | | | ID=2; 5 BLOCKS OF DO DATA | | | | |
| SEGMENT #2 | | ID=2; 1 BLOCK OF DO METADATA | ID=3; 1 BLOCK OF DO METADATA | | | | | | | | | | | | | | | | | |
| SEGMENT #3 | ID=2; 15 BLOCKS OF DO DATA | | | | | | | | | | | | | | | ID=3; 5 BLOCKS OF DO DATA | | | | |
| SEGMENT #4 | ID=3; 15 BLOCKS OF DO DATA | | | | | | | | | | | | | | | | | | | |
| SEGMENT #5 | ID=1; 15 BLOCKS OF UNDO DATA | | | | | | | | | | | | | | | | | | | |
| SEGMENT #6 | ID=1; 1 BLOCK OF UNDO METADATA | | | | | | | | | | | | | | | | | | | |

US 8,214,612 B1

ENSURING CONSISTENCY OF REPLICATED VOLUMES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to ensuring consistency of a replicated volume

BACKGROUND

Computer data is vital to today's organizations, and a significant part of protection against disasters is focused on data protection. As solid-state memory has advanced to the point where cost of memory has become a relatively insignificant factor, organizations may afford to operate with systems that store and process terabytes of data. Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site may recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

SUMMARY

A method, system, and program product for ensuring consistency of dynamically changing volumes comprising creating a production change map for a first volume; wherein the production change map is marked to represent pending IO, creating a replication change map for a second volume; wherein the replication change map is marked to represent pending IO, transferring a first signature corresponding to a portion of the first volume to the replication volume, wherein the signature does not include the portion marked as pending IO in the production change map, comparing the first signature to a second signature, the second signature corresponding to a portion of the replication volume corresponding to the portion of the production volume; wherein portions marked as dirty in the replication change map are not included in the signature.

DESCRIPTION OF DRAWINGS

The present invention will be more fully understood and appreciated from the following detailed description, taken in conjunction with the drawings in which:

FIG. 3 is a simplified illustration of a first stage of a journal and four data streams stored therein, after recording three write transactions, in accordance with an embodiment of the present invention;

FIG. 4 is a simplified illustration of a second stage of a journal and four data streams stored therein, after applying a first write transactions to a storage system, in accordance with an embodiment of the present invention;

DETAILED DESCRIPTION

Figure 1:
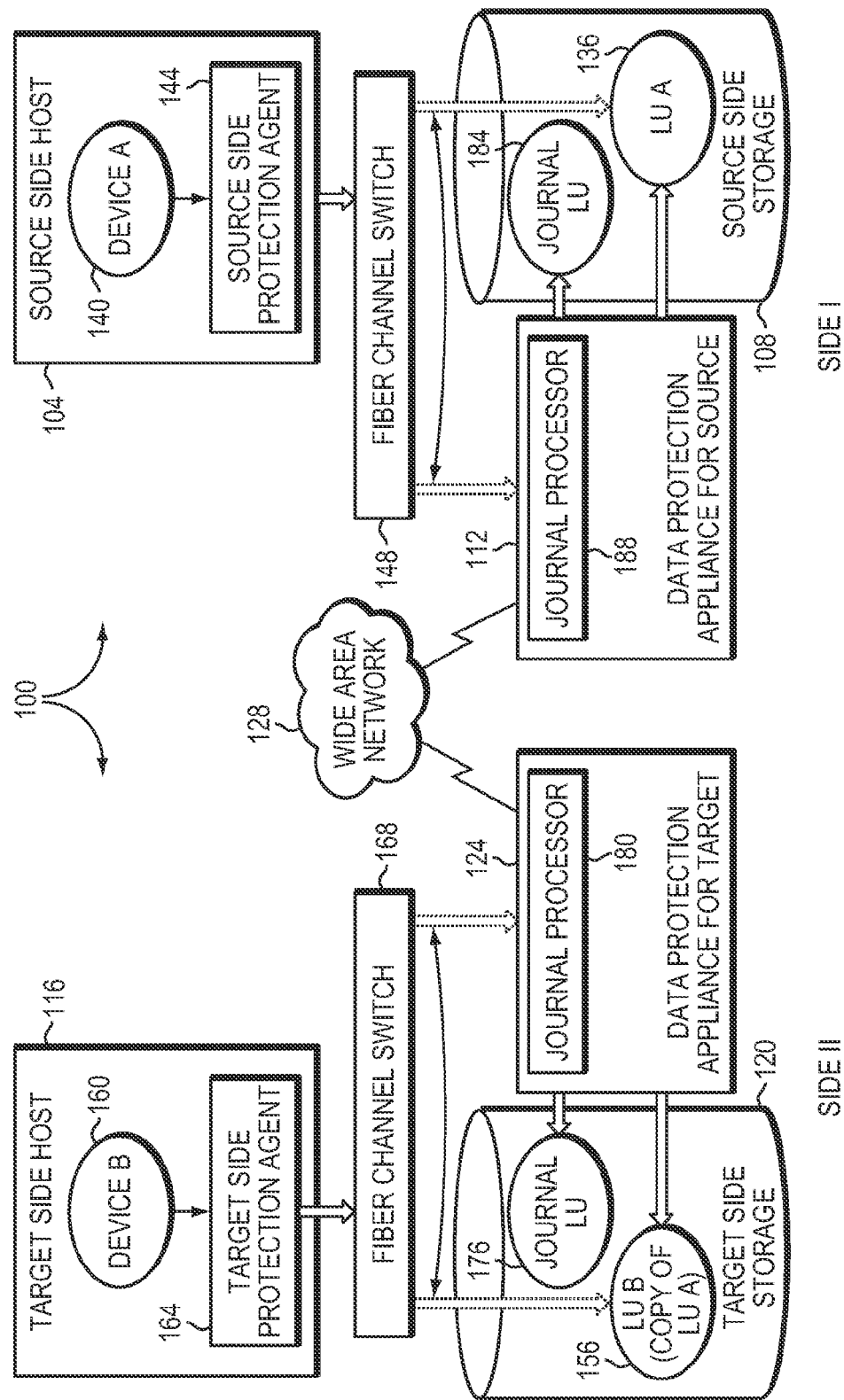
FIG. 1 is a simplified block diagram of a data protection system, in accordance with an embodiment of the present invention.

Because of the complexity of data replication systems, typical data replication systems do not allow comparison of the production and replication images; herein the terms images, volumes, and drives may be used interchangeably to represent the production data and the replication data. The complexity result as, at any point in time, pending writes may or may not have been applied to either the production or replication images. Thus, the images may be at different points in time and comparison of these images typically may not account for such differences. Typically, to compare the images, IO to the system must be stopped, all pending IO must be processed, and then the images may be compared for consistency. However, this typical comparison halts all IO while the comparison happens, essentially stopping the production and replication system from recording any IO data. Another typical alternative may be to create a snapshot for both the production and replication image then do a comparison; however creating the snapshot and performing a comparison this way takes time, memory and processing power.

Techniques of the current invention may configure a data storage system, to enable verification of a replicated drive or volume, when that replicated drive may be dynamically changing. For example, in a particular embodiment the replicated drive may be receiving updates as replication is occurring, while consistency of the drive is being checked, and while the data on the drive is also changing. In another embodiment, the replicated drive may be in the process of being rolled backed to an earlier time while consistency is being checked. Both these scenarios presented numerous problems to typical replicated systems such that consistency of drive and the replicated drive may not be checked.

In an embodiment, the current techniques provide a means for checking consistency of a replicated drive and the replication to determine whether or not the data on both drives is consistent, even when the drives may not be updated to the same time period. In some embodiments, the current techniques account for writes that are scheduled but have not been written to the either drive, writes that have been written to one drive but not the other, and writes that have been written to both drives. Herein, source and production and target and replication are used interchangeably as are drive, image, and volume; however the data of the source and replicated systems may be striped across multiple volumes and or drives to form the source and target images.

The current techniques may be practiced on any type of data storage system, however the current techniques may be particularly useful on the CLARiiON and SYMMETRIX data storage system as produced by EMC Corporation of Hopkinton, Mass. A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Replication

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time. However, at any point during the replication, the drives may be inconsistent, depending on what pending IO information may need to be written to the drives (the inconsistency may be due to an application error, or user misconfiguration, for instance user allows host accessing the replica site while replicating is in progress).

During normal operations, the direction of replicate data flow goes from source side to target side. It is possible, however, for a user to reverse the direction of replication data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not. In this particular instance, as the drives or volumes switch roles, the volumes may be inconsistent until the switch from replication to production site is complete. However, even once complete, the replication and production sites may differ according to pending IO for each drive.

The production site and the backup site may be remote from one another, or they may both be situated at a common site, local to one another. Local data protection has the advantage of minimizing data lag between target and source, and remote data protection has the advantage is being robust in the event that a disaster occurs at the source side. In a particular embodiment, the source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple. SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A. In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

The protection agent may run inside the FC switch (Cisco/Brocate) or inside the storage array (CLARiiON splitter), in this case the agent behavior may be different While in production mode, DPA 124 receives replicated data of LU A from DPA 112, and performs journaling and writing to storage system 120. When applying write operations to storage system 120, DPA 124 acts as an initiator, and sends SCSI commands to LU B. During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

As there may be delays in transmitting information from source to target site and that IO transmitted from source to target may be applied to each drive inconsistently, the drives may be inconsistent, only in that they are at different points in time. In a typical comparison, the drives may appear inconsistent, unless all IO to the drives was stopped and all pending IO to the drives was completed There may be two types of inconsistencies, the first type of inconsistency may be that drives may be inconsistent since the drive are at different points in time. Previous techniques have not usually addressed this type of inconsistency and were therefore not able to ensure the drives were consistent. The current techniques accounts for a difference in time, do to non-uniform processing of IO and further identifies an inconsistency where an IO reach one drive and not the other.

Journal

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) updates the journal entries in the journal LU with undo information and removes already-applied transactions from the journal, (iii) applies the journal transactions to LU B, and. As described below, with reference to FIGS. 2 and 3A-3B, journal entries include four streams, two of which are written when write transaction are entered into the journal, and two of which are written when write transaction are applied and removed from the journal.

Figure 2:
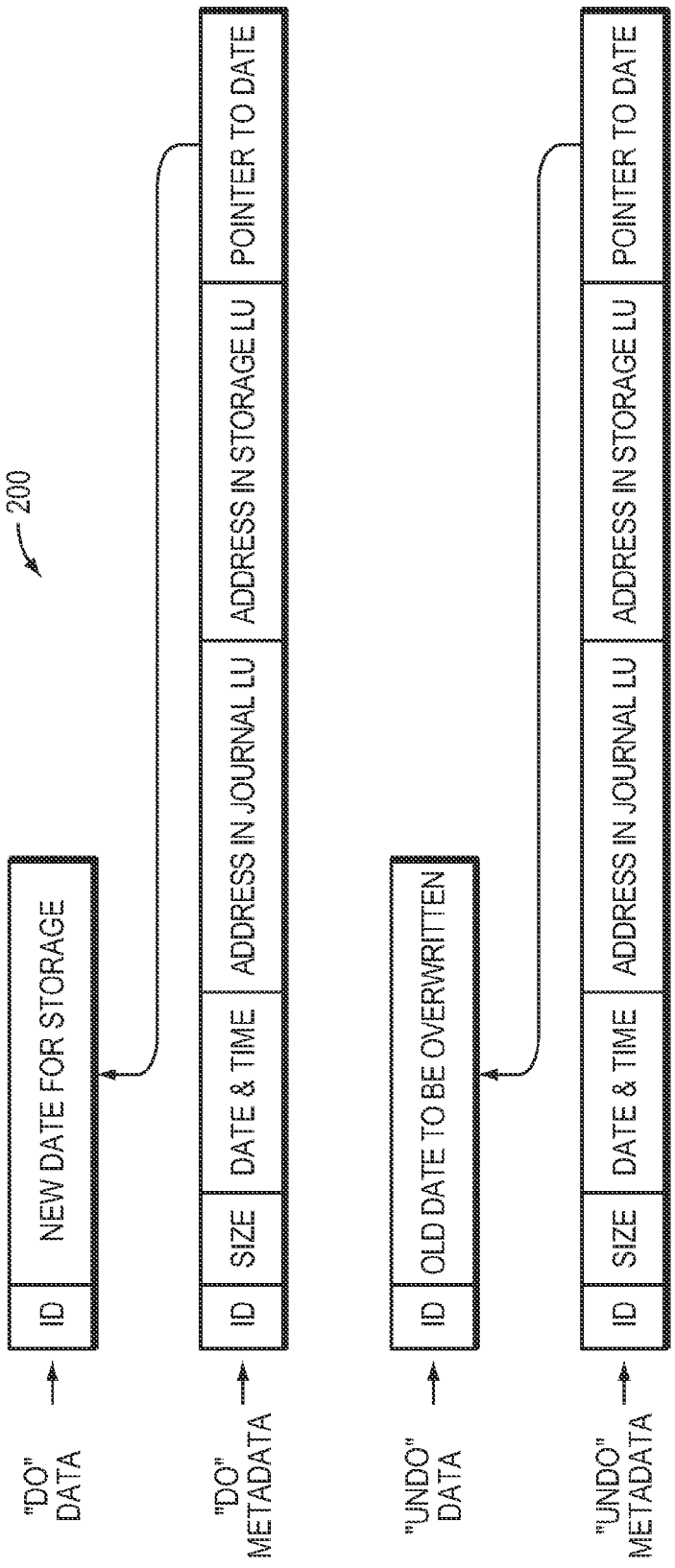
FIG. 2 is a simplified illustration of a journal history of write transactions for a storage system, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:

one or more identifiers;

a time stamp, which is the date & time at which the transaction was received by source side DPA 112;

a write size, which is the size of the data block;

a location in journal LU 176 where the data is entered;

a location in LU B where the data is to be written; and the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as indicated in TABLE I below.

TABLE I

Entering a write transaction in the journal

| | |
|---|---|
| Step 1 | The new data is written at the end of the DO stream, assuming a forward write direction, and corresponding metadata is written at the end of the DO METADATA stream. |
| Step 2 | Data is read from the beginning of the DO stream, and corresponding metadata is read from the beginning of the DO METADATA stream. |
| Step 3 | Old data to be overwritten is read from LU B. The location and size of such old data is determined from the DO METADATA stream. |
| Step 4 | The old data is written at the end of the UNDO stream, and corresponding metadata is written at the end of the UNDO METADATA stream. |
| Step 5 | The new data read at Step 2 is written into LU B, and the beginning and end pointers of the DO and DO METADATA streams are moved appropriately. |

Conversely, during a rollback to undo a write transaction, the above operations are reversed, as indicated in TABLE II below.

TABLE II

Undoing a write transaction in the journal

| | |
|---|---|
| Step 1 | Read the data and metadata from the end of the UNDO and UNDO METADATA streams. |
| Step 2 | Read from LU B the data that is to be overwritten. The location and size of such data is determined from the UNDO METADATA stream. |
| Step 3 | Write the data from Step 2 at the beginning of the DO stream, and update the DO METADATA stream accordingly. |
| Step 4 | Write the data from Step 1 to LU B, and update the beginning and end pointers of the UNDO and UNDO metadata streams appropriately. |

Figure 3:
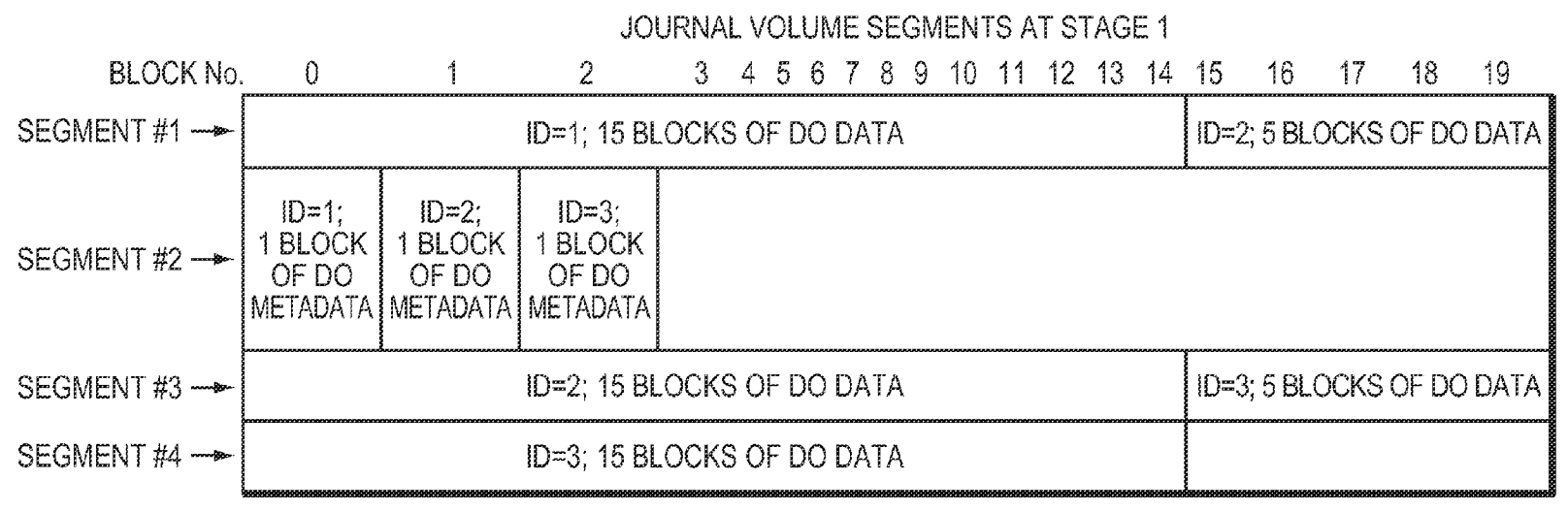

The following example, in conjunction with FIGS. 3A and 3B, describe some specific details of the journaling process, in accordance with an embodiment of the present invention. A journal volume includes a plurality of segments from a segment pool, each segment including 20 data blocks.

Three write transactions are received, as indicated in TABLE III.

TABLE III

Example Write Transactions

| Write ID | Time | LU B location | Length | Journal LU location |
|---|---|---|---|---|
| 1 | Dec. 03, 2005 10:00:00.00 | LU B offset 57 blocks | 15 blocks | Segment 1, offset 0 |
| 2 | Dec. 03, 2005 10:00:00.05 | LU B offset 87 blocks | 20 blocks | Segment 1, offset 15 |
| 3 | Dec. 03, 2005 10:00:00.18 | LU B offset 12 blocks | 20 blocks | Segment 3, Offset 15 |

The following discussion describes four stages of journaling and data storage; namely, Stage #1: Enter the three write transactions as journal entries in the journal LU.
Stage #2: Apply the first write transaction to LU B.
Stage #3: Apply the second write transaction to LU B.
Stage #4: Rollback the second write transaction, to recover data from an earlier point in time.

Further, consider the scenario when the replication or source volume is being rolled forward or backward in time. In this case, even if all pending writes were applied to the volumes, the drives may be inconsistent if compared because they were at different points at time. Only if the changes to drives were considered, e.g. the drives moved to the same point in time, may the drives be correctly compared.

Consistency

Given the complexities with replication, such as those described above, typical replication solutions have not offered the ability to determine whether or not the replication volume is consistent with the production volume, while changes are occurring to one or both volumes. In typical replication solutions, this may be because a comparison between two volumes may not have been possible as the volumes may not be updated to a common point in time and any comparison might therefore be comparing these two volumes at different times.

Therefore, to enable a determination of consistency to determine whether all IO was successfully transferred to both volumes, previous solutions may have to quiesce both volumes, process pending changes to both volumes, then do a comparison of the volumes. Such a process may not be possible if data needed to be continuously written to the volumes or if the drives were being rolled back to a different point in time. Another typical solution was to take a snapshot at a point in time at both sites, but handling the snapshots requires resources.

In an embodiment, the current techniques enable comparison of a production and replication volume by dividing the volumes or disk into pieces of equal size. For each volume, a bitmap of size corresponding to the piece may be created where each bit in the bitmap represents a block number; i.e. a production bitmap and a replication bitmap may created. For each block of the piece of volume to be compared, a bit may exist in the bitmap. For example, if a drive consisted of 100,000 blocks, 10 divisions of 10,000 blocks may be created and a corresponding bitmap may be created for 10,000 blocks and the values of the bitmap set to zero. For the production site, all IOs are flushed for the piece of the disk to be compared. For each IO that may be written to that piece, the corresponding block in the production bitmap may be set to 1, which marks the block as dirty or changed. On the replication site, all the IOs may also be flushed and the replication bitmap may be marked if there is IO written to the piece to be compared. As well, the replication site may also be updated for further changes.

For example, the data in the DO stream may be used to mark the replication bitmap. In the case when the replication is being moved to a new point in time, the replication bitmap may be updated before the data is written to the replication drive.

A comparison of the drives may be performed, using the bitmap to note portions of the drive that are being updated and may not be compared. A portion of the piece of the production volume site may be used to create a signature. When the signature is created, the production bitmap may be referenced so that the portions of the production volume that are marked as dirty are not included in the signature. The signature may be sent from the production site to the replication site. The replication site may create a signature of the same locations that were used to create the signature at the production site. If the signatures match, then this piece of the replication and production drive may be considered to be consistent and processing the rest of the volume comparison may continue.

If the signatures do not match, the replication site may send the locations of the drive that were not consistent to the production site. The production site may test to see if additional IO occurred at these locations. If additional IO occurred at these locations, the portion may be assumed to be consistent. If no additional IO occurred, then this portion of the drive may be considered to be non-consistent and the portion of the drive may be marked. In some embodiments, finding of an inconsistency may end the comparison. In other embodiments, the inconsistency location may be added to a list so the inconsistency may be corrected. In an alternative embodiment, the user may be notified.

Figure 5:
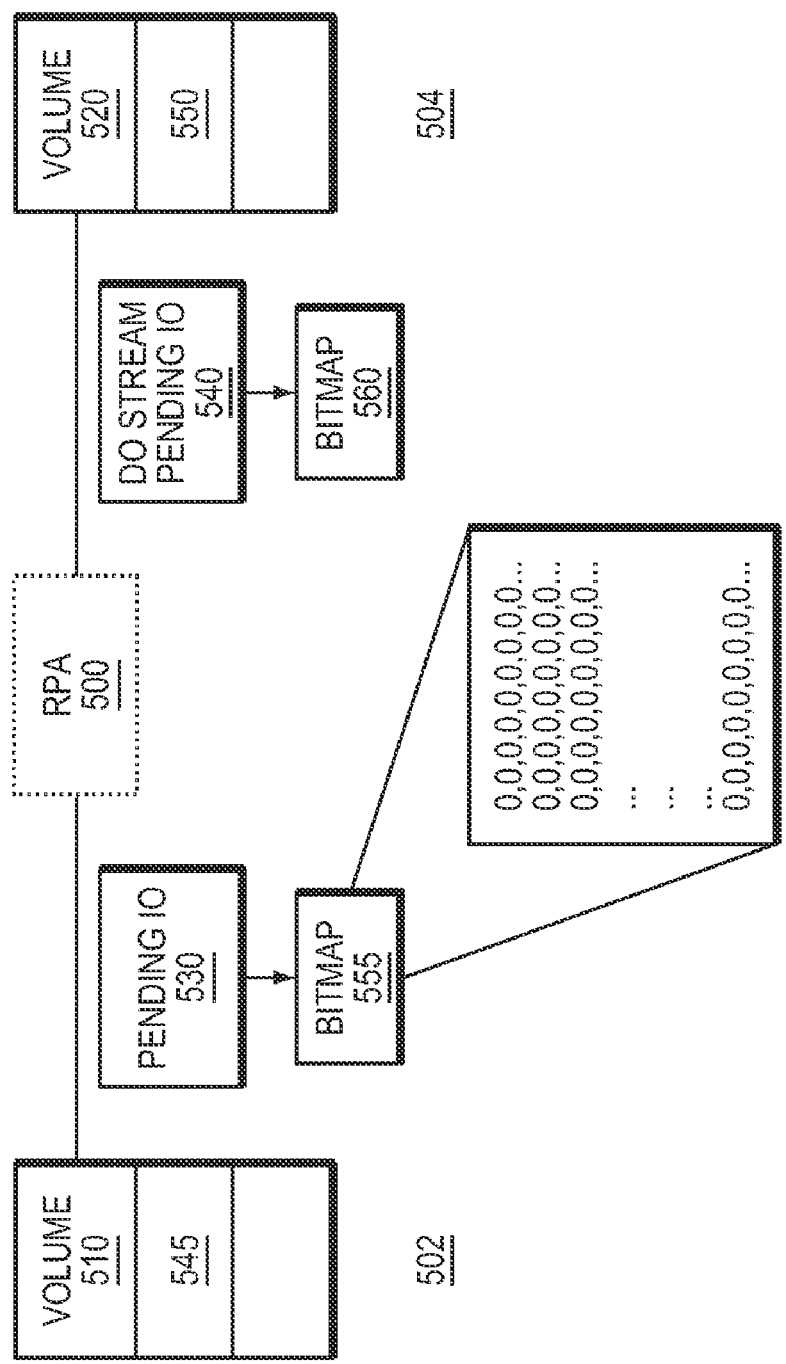
FIG. 5 is a simplified block diagram of a data protection system, in accordance with an embodiment of the present invention illustrating an embodiment of a tracking data structure.

Referring to the embodiment of FIG. 5, the current techniques enable a dynamic determination of consistency of replicated volumes such as volumes 510 and 520, when those volumes 510 and 520 may be changing and may be at different points in time. During a determination of consistency of the volumes 510 and 520, Replication Appliance 500 may be continuing to transfer data from the production site 502 to the replication site 504. For example, volume 510 has pending IO 530 and volume 520 has DO Stream pending IO or IOs 540. In an embodiment of the current invention, the production and replication volumes 510 and 520 may be divided into partitions or divisions of a given size, for example size X as illustrated by division 545 for volume 510 or division 550 for volume 520.

Figure 6:
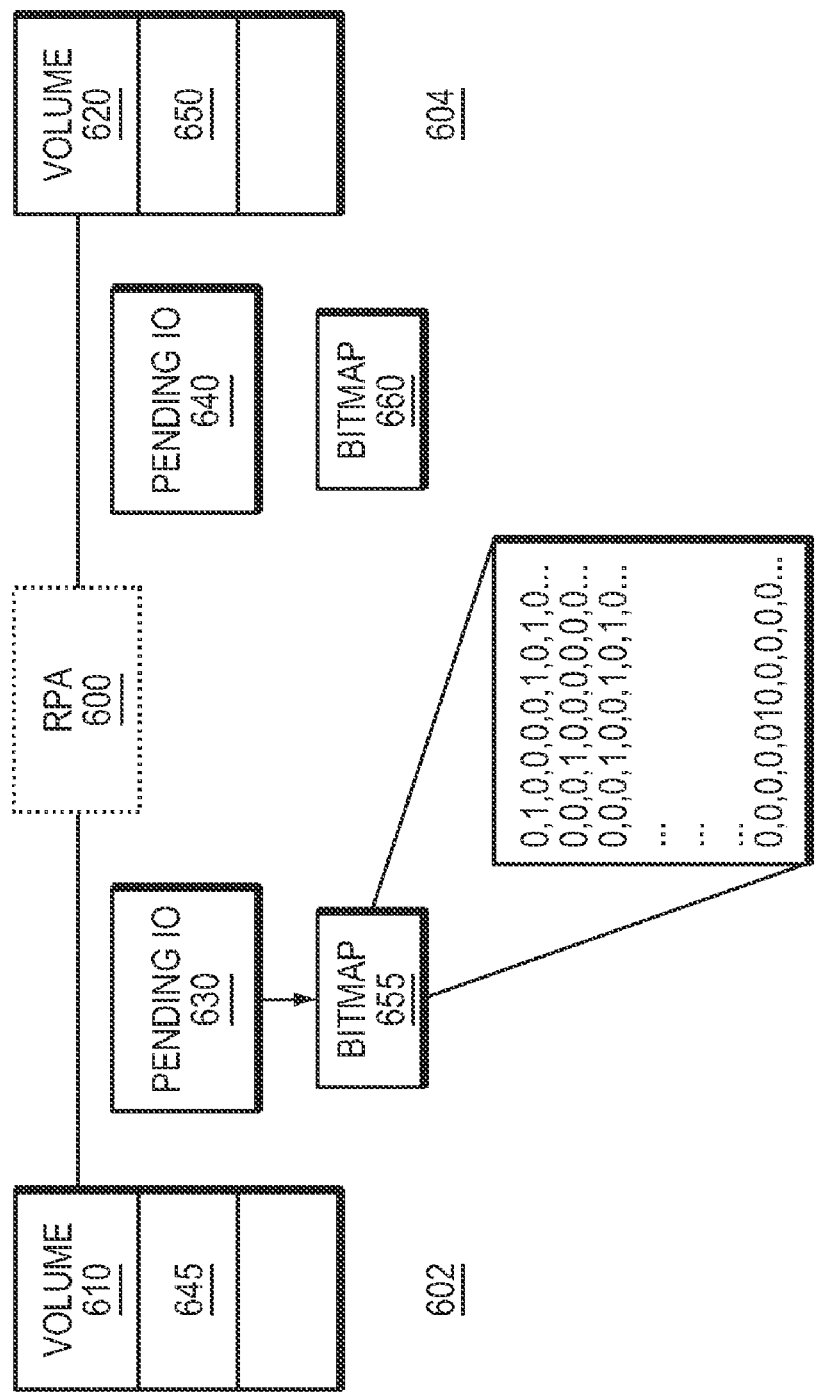
FIG. 6 is a simplified block diagram of a data protection system, in accordance with an embodiment of the present invention illustrating an embodiment of a tracking data structure with pending IO.
Figure 9:
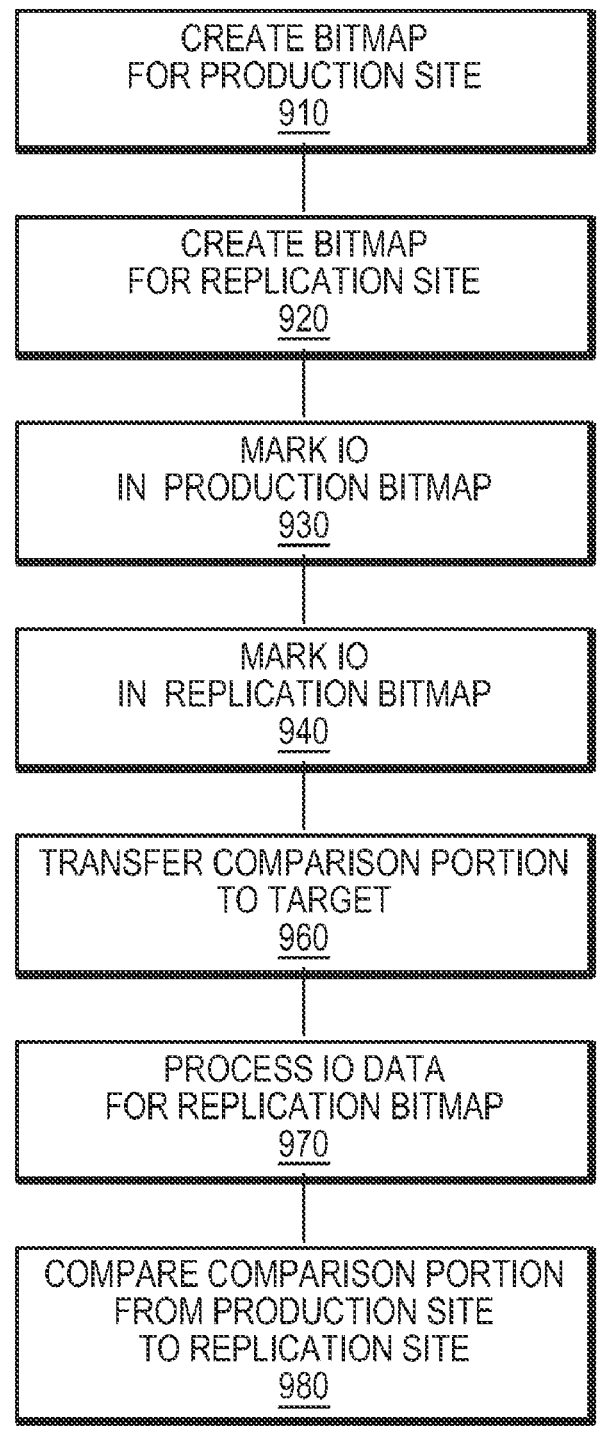
FIG. 9 is a simplified flowchart of a data consistency method, in accordance with an embodiment of the present invention to determine consistency of a production and replication volume.
Figure 10:
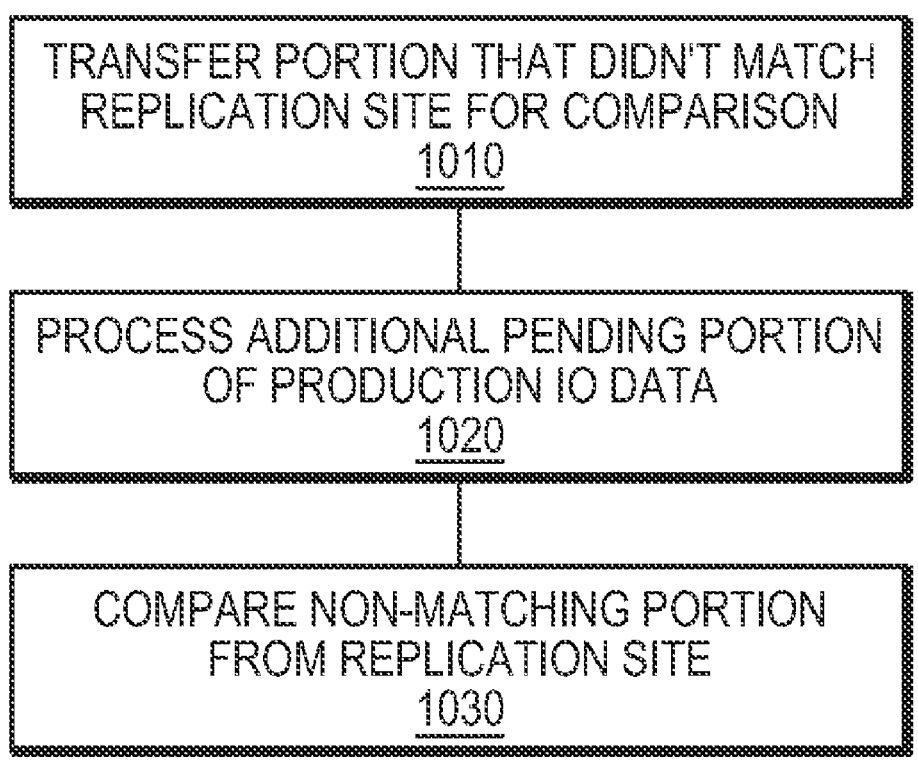
FIG. 10 is a simplified flowchart of a data consistency method, in accordance with an embodiment of the present invention to determine consistency of a production and replication volume.

In an embodiment of the current techniques as shown in FIG. 5 and FIG. 9, a bitmap may be created 910, 920 for the production volume 510 and for the replication volume 520; for example production bitmap 555 and replication bitmap 560. In an embodiment, the bitmap created represents a tracking data structure that tracks the IO that will be written to the division being compared. Each bit in the bitmap represents a block in the division being compared and, upon creation, each value in the production bitmap 555 may be set to 0. In the embodiment bitmap 555 of FIG. 5, the bitmap may be represented as a matrix of values; however the tracking data structure may be represented in any number of ways. Referring now to FIGS. 6 and 10, the IO 630 pending to be applied to the production volume 610 may be used to mark 950 portions of the production bitmap 655 as "dirty" or set the value in the bitmap corresponding to the block to be 1.

Figure 7:
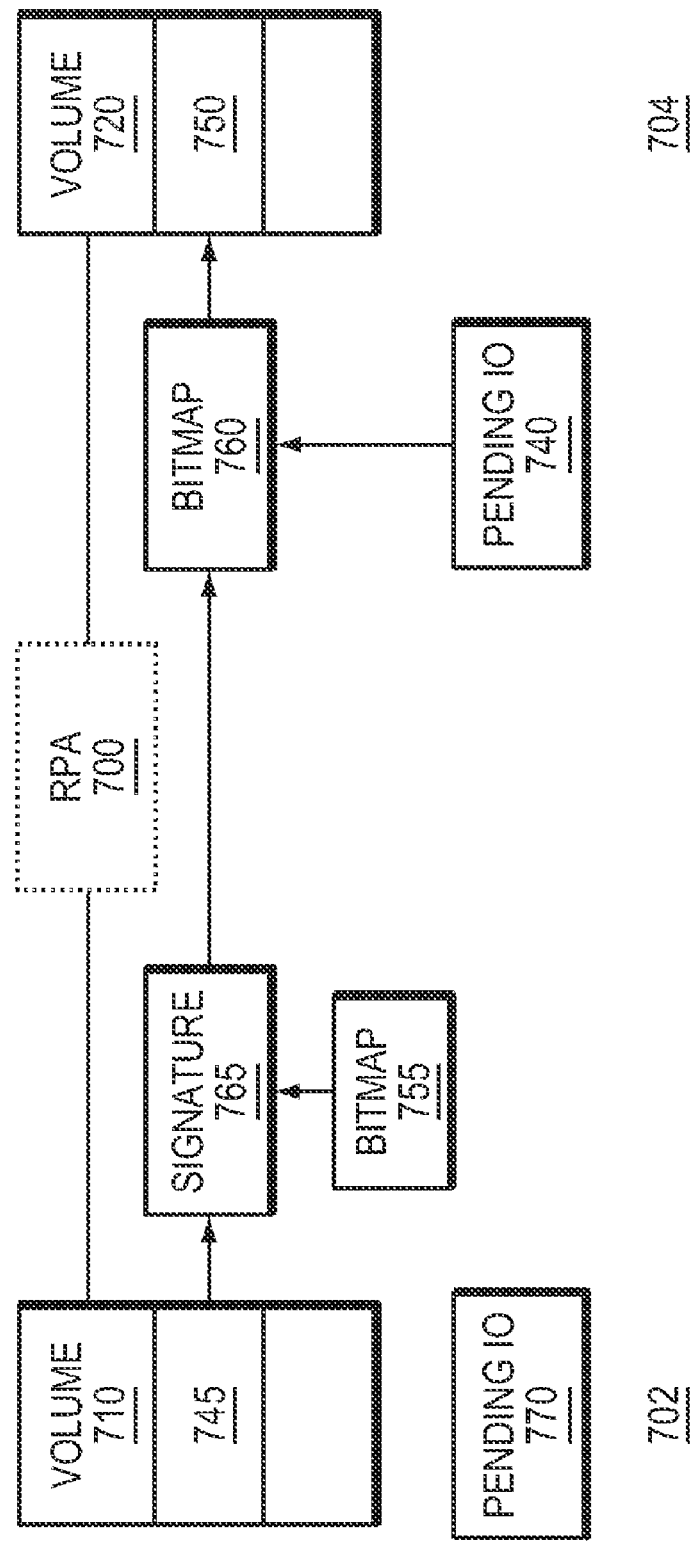
FIG. 7 is a simplified block diagram of a data protection system, in accordance with an embodiment of the present invention illustrating an embodiment of a signature.
Figure 11:
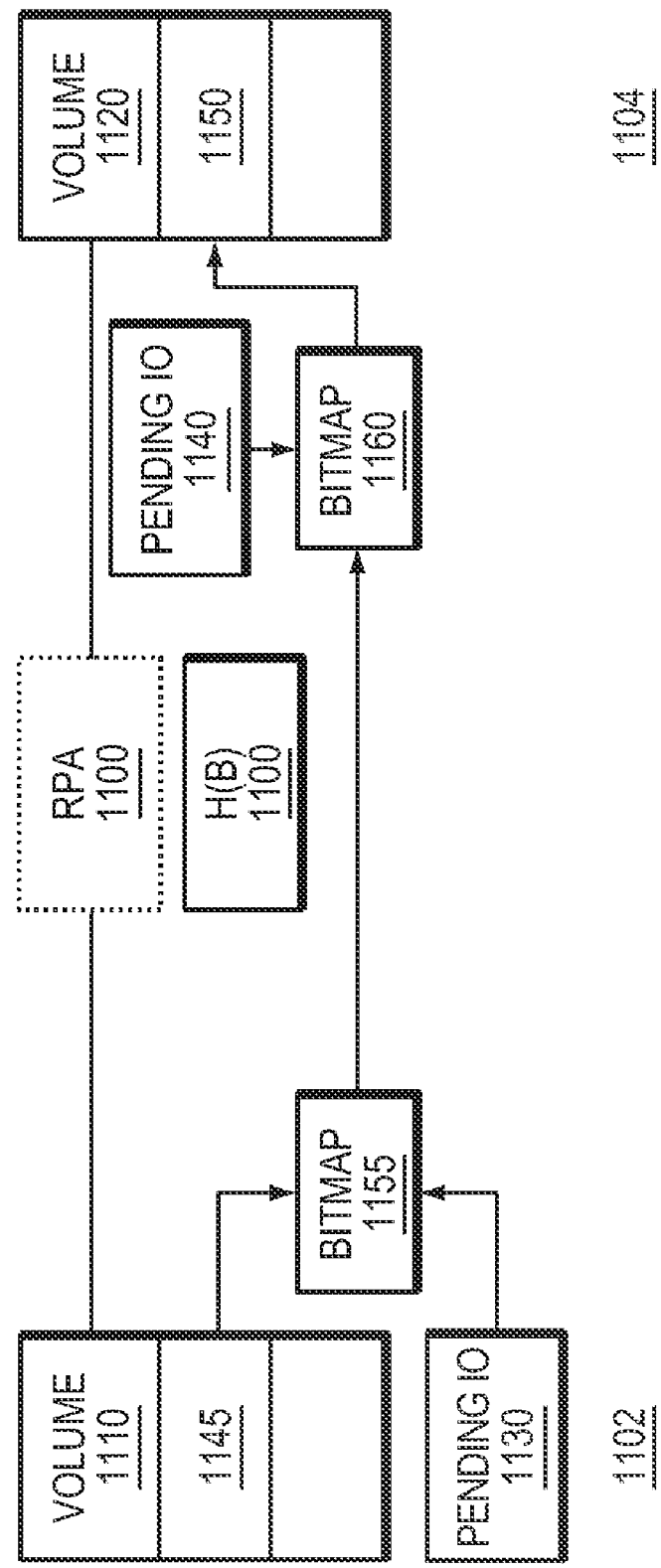
FIG. 11 is a simplified block diagram of a data protection system, in accordance with an embodiment of the present invention illustrating an embodiment of a hash value.
Figure 12:
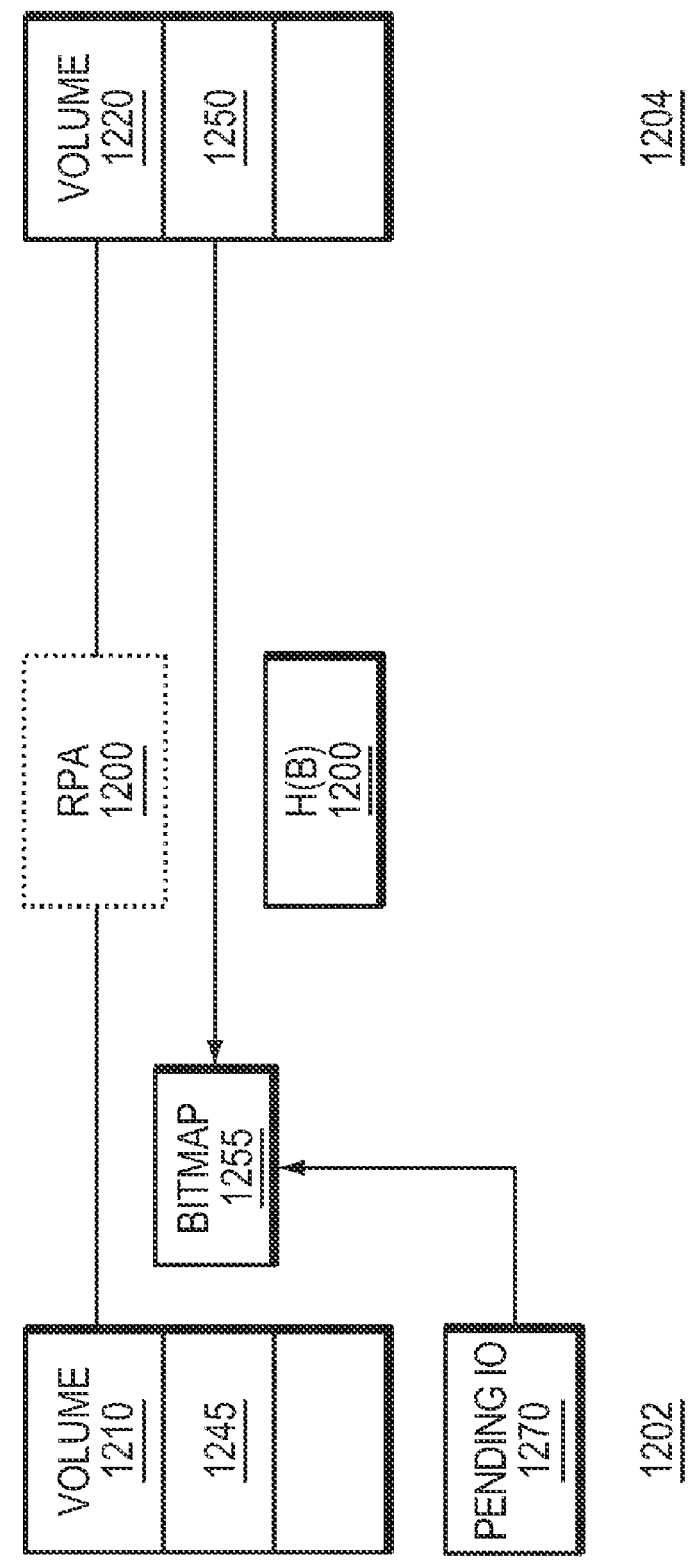
FIG. 12 is a simplified block diagram of a data protection system, in accordance with an embodiment of the present invention illustrating an alternative embodiment of a non-matching portion of a replication volume being sent from a replication site to a production site.

Referring to FIG. 7 and FIG. 9, the production bitmap 755 may be used with a piece of the portion 745 being compared to create a signature, such as signature 765, for the piece being compared at the production site 702 to the replication site 704. That is, a number of blocks will be selected for transfer, the production bitmap 755 will be checked and those blocks marked as dirty will not be considered or included in the signature 765. The remaining blocks will be used to create signature 765. Signature 765 may be transferred 960 to the replication site 704. In some embodiments, the blocks to be compared may be transferred 960 bit for bit. In other embodiments, such as the embodiment of FIG. 11, the signature may be represented by hash 1100, which represents a hash of portions of the comparison portion 1145 being transferred to the replication site 1104. In the embodiment of FIG. 7, a signature 765 of the blocks of the portion 745 may be transferred from the production site 702 to the replication site 704.

As well, only the piece of the portion 745 that was not marked dirty in bitmap 755 may be sent to be compared to the replication site 704.

Figure 13:
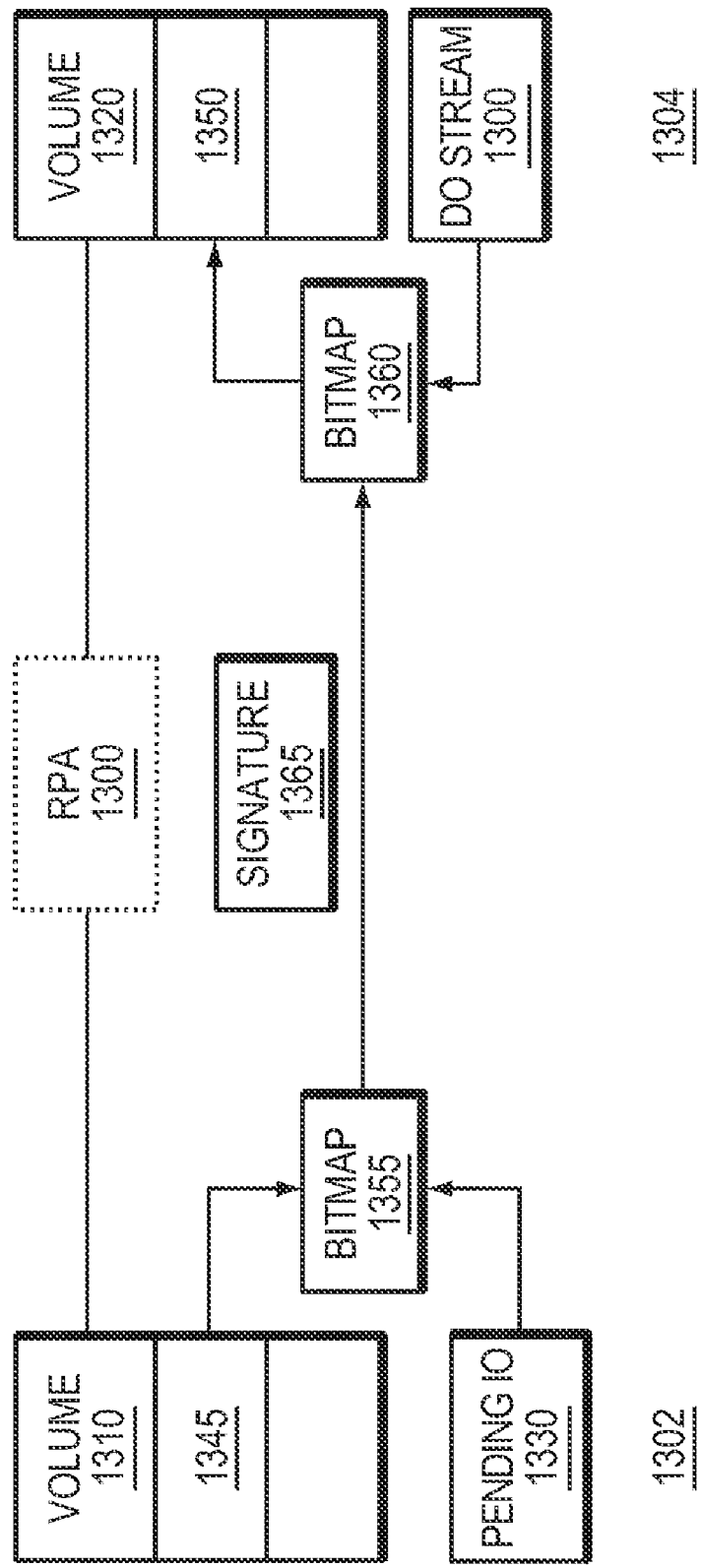
FIG. 13 is a simplified block diagram of a data protection system, in accordance with an embodiment of the present invention illustrating an embodiment of a hash value and DO stream data.
Figure 14:
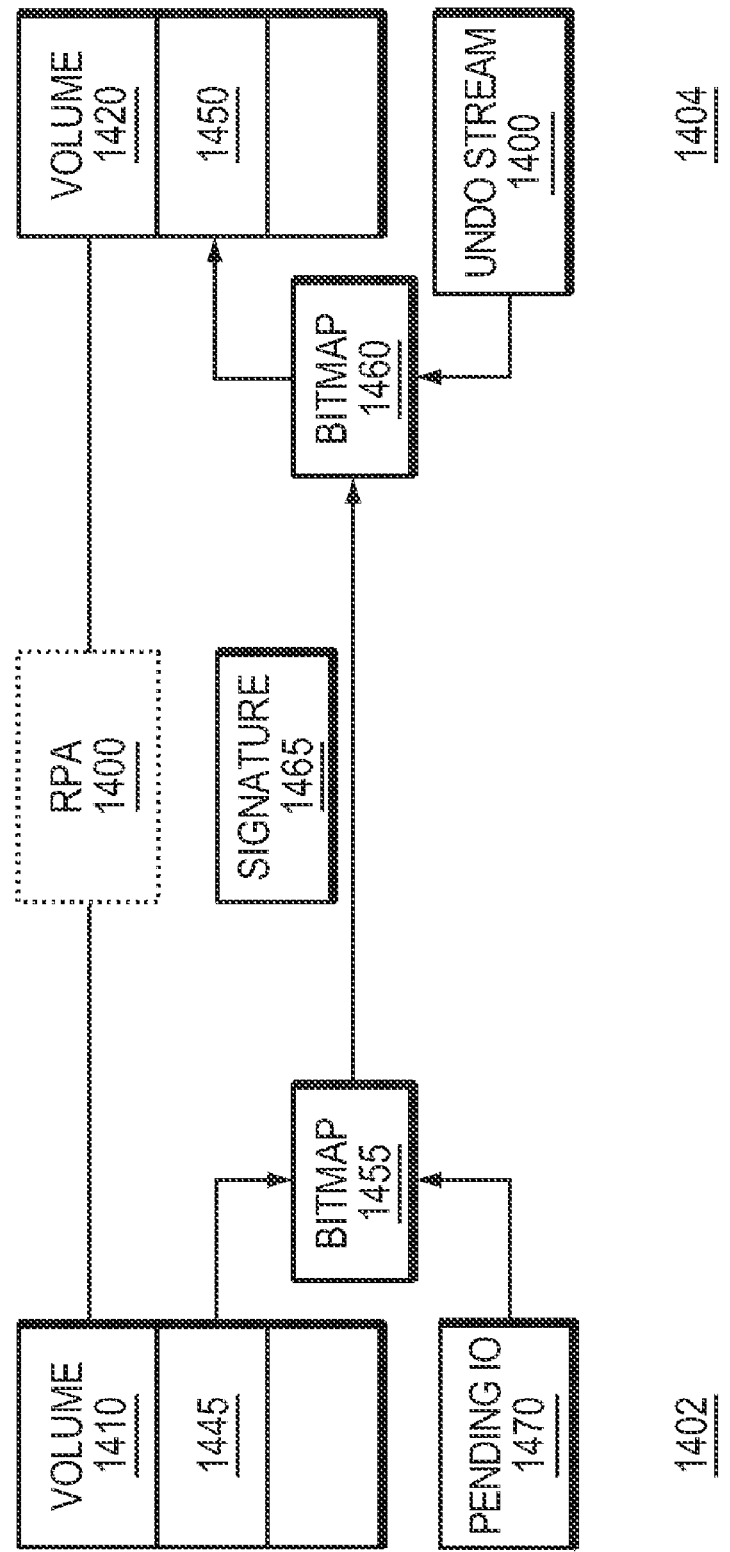
FIG. 14 is a simplified block diagram of a data protection system, in accordance with an embodiment of the present invention illustrating an embodiment of a hash value and UNDO stream data.
Figure 15:
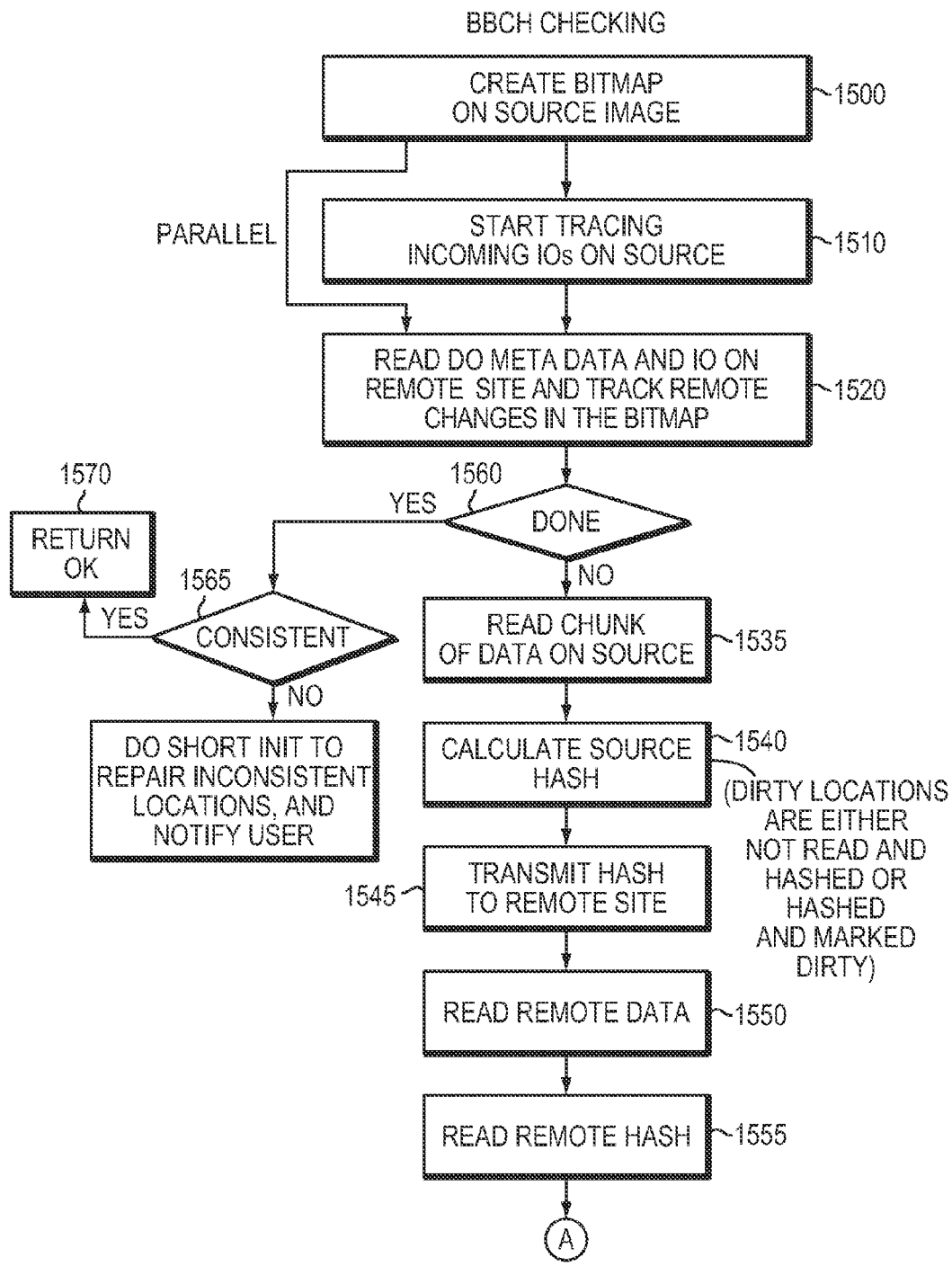
FIG. 15 is a simplified flowchart of a data consistency method, in accordance with an alternative embodiment of the present invention to determine consistency of a production and replication volume.
Figure 16:
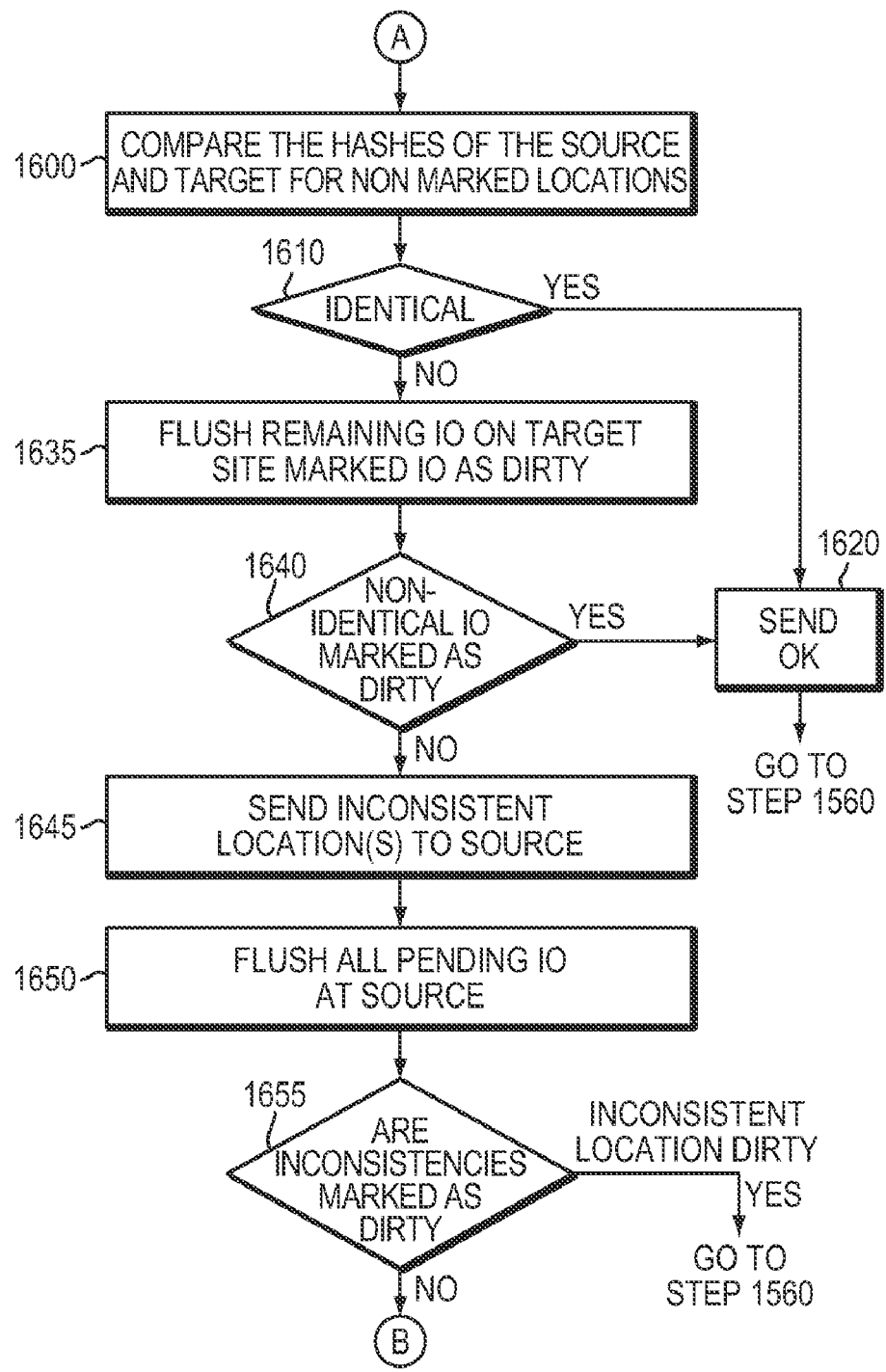
FIG. 16 is a simplified flowchart of a data consistency method, in accordance with an alternative embodiment of the present invention to determine consistency of a production and replication volume.
Figure 17:
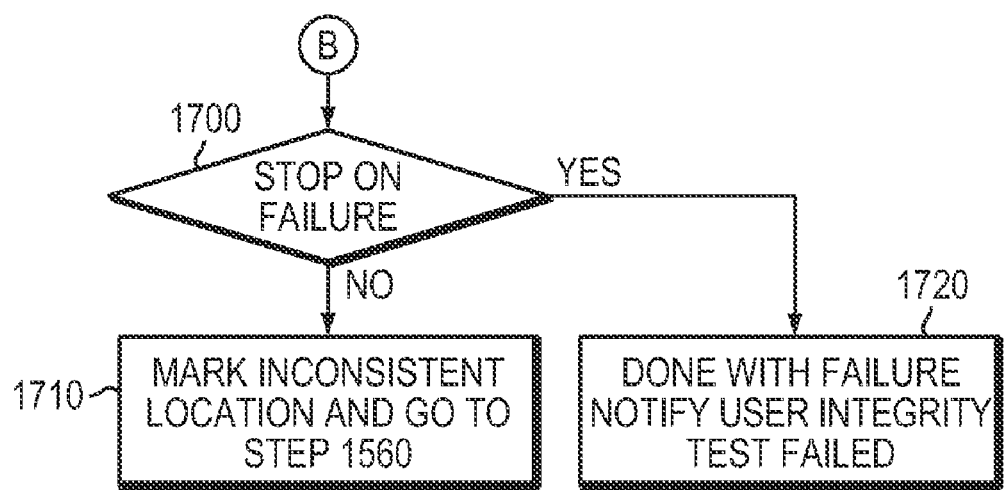
FIG. 17 is a simplified flowchart of a data consistency method, in accordance with an alternative embodiment of the present invention to determine consistency of a production and replication volume.
Figure 18:
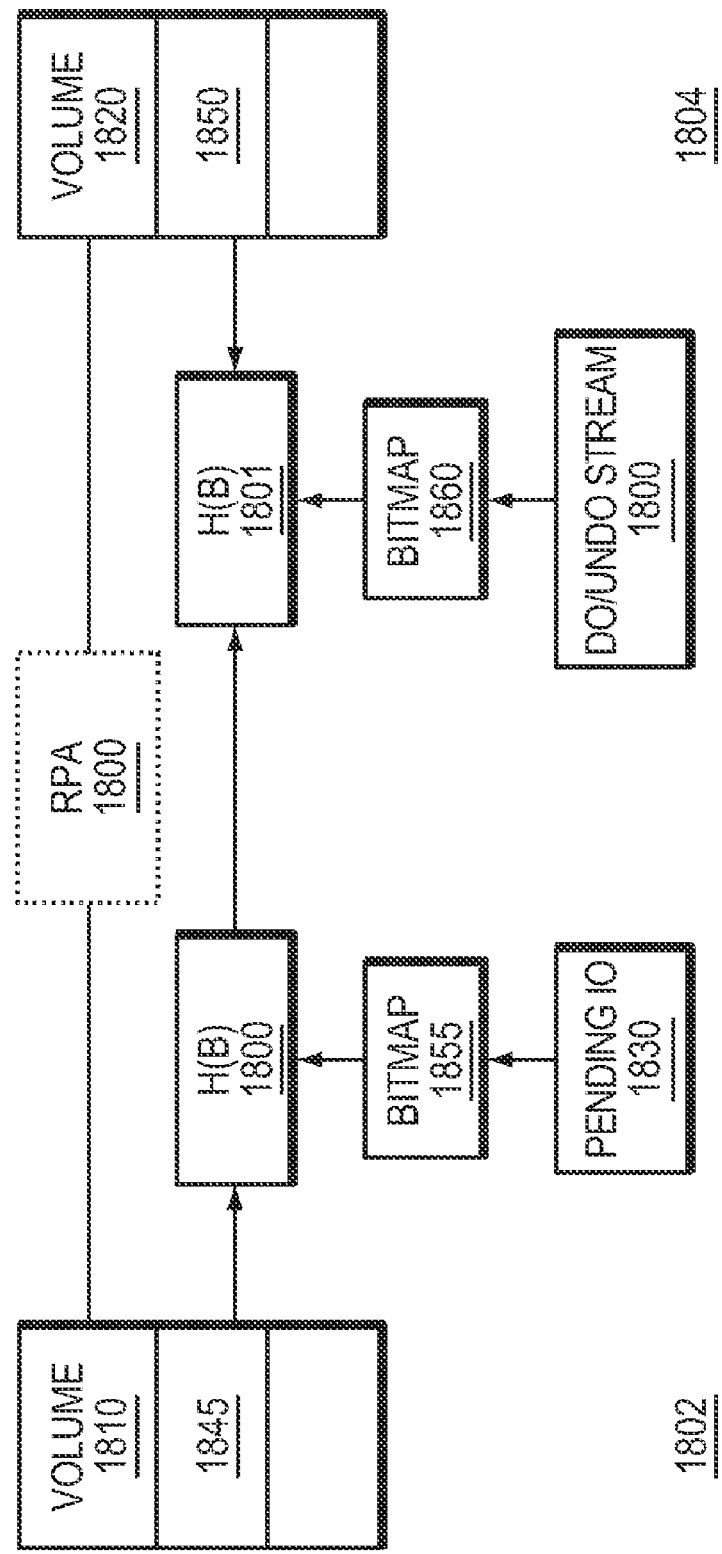
FIG. 18 is a simplified block diagram of a data protection system, in accordance with an embodiment of the present invention illustrating an embodiment of a production hash value and a replication hash value.
Figure 19:
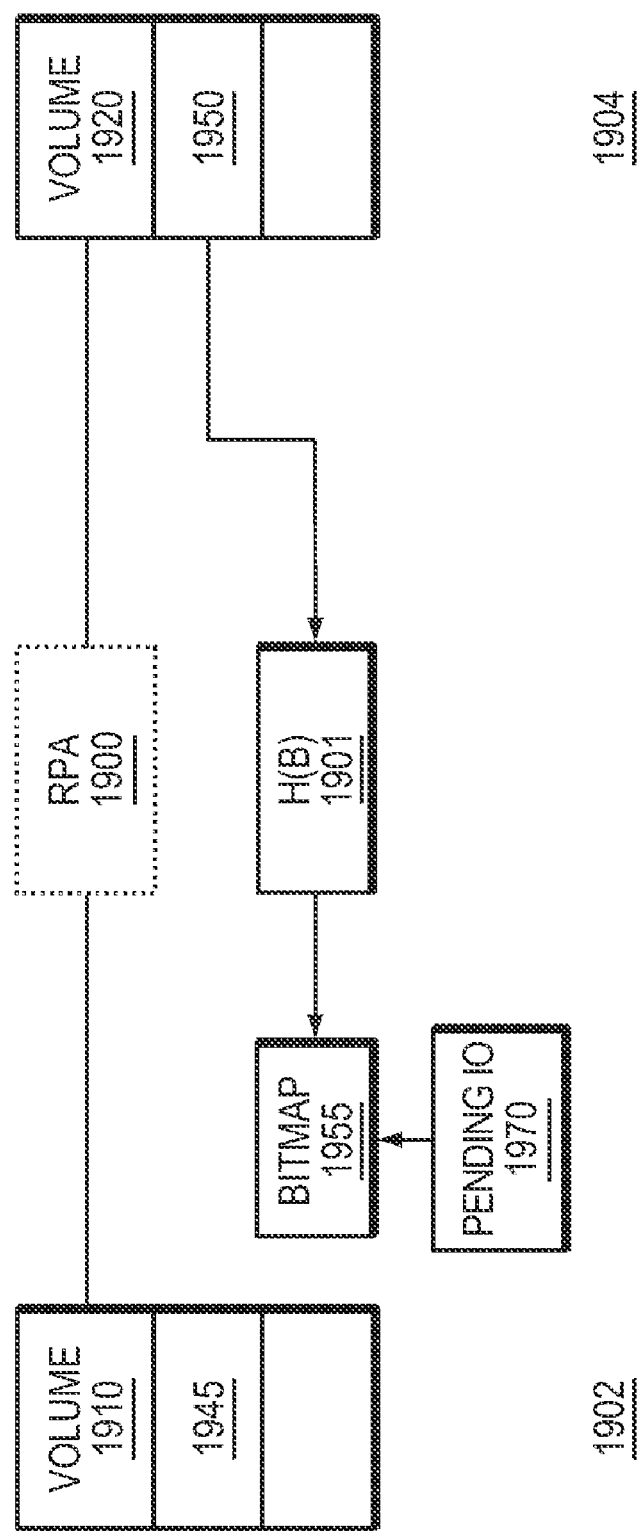
FIG. 19 is a simplified block diagram of a data protection system, in accordance with an alternative embodiment of the present invention illustrating an embodiment of a non-matching portion of a replication volume being sent from a replication site to a production site.

In an embodiment, the bitmap 760 at the replication 704 site may be constructed similarly to the bitmap 755 at the production site 702. In an alternative embodiment, the bitmap 760 at the replication site 704 may build all the bits from the DO stream, such as is shown in the embodiment of FIG. 13 DO meta stream 1300, may be read into the bitmap 1360. The locations in the DO meta stream 1300 may be the locations where the data in the production site 1302 is newer then the remote site 1304. The point in time may be rolled forward by reading data from the DO stream 1300. In this embodiment dirty bits may not need to be added to the bitmap 1360 as the remote site 1304 may be becoming more like the local or production site 1302. In another embodiment, when rolling back using the undo stream, such as may be seen in the embodiment of FIG. 14 UNDO stream 1400, it may be necessary to add new locations to the bitmap 1460, as the replication site 1404 may be moving to an older point in time.

The corresponding piece of the replication portion 750 may be used for comparison 980 with the signature 765 from the production site 702. If the production signature 765 matches the piece of the replication portion 750 comparison is successful, however values marked as dirty in the replication bitmap 760 will not be compared.

Figure 8:
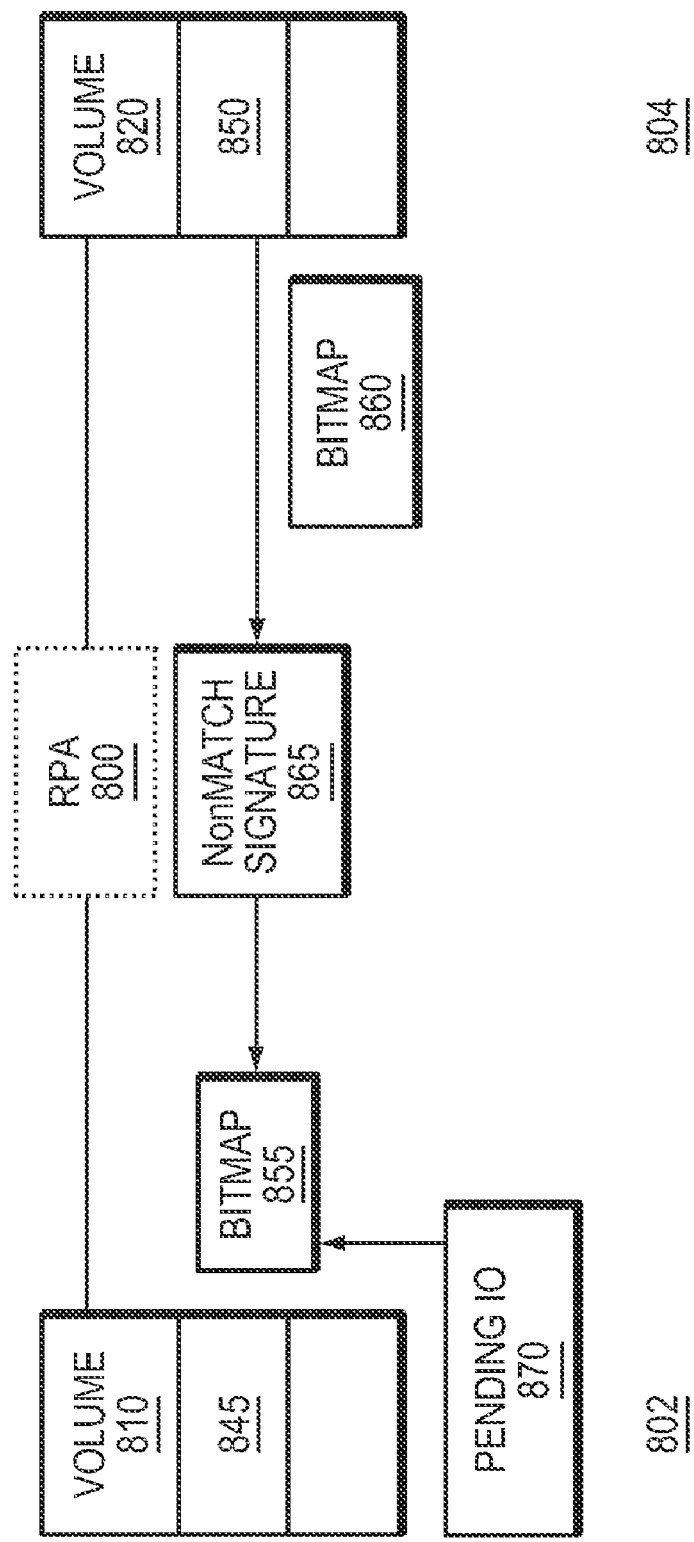
FIG. 8 is a simplified block diagram of a data protection system, in accordance with an embodiment of the present invention illustrating an embodiment of a non-matching portion of a replication volume being sent from a replication site to a production site.

In the case where a comparison on the replication volume 720 denotes an inconsistency at the replication site 704, further steps may be taken as shown in FIGS. 8 and 10. The inconsistent portion 865 of the replication portion 850 may be sent 1010 to the production site 802 to be compared with the bitmap 855. Then, the production bitmap 855 may process 1020 any further IO 870. If new IO 870 has occurred the portion of the production bitmap 855 which corresponds to the inconsistent portion 865 of the replication bitmap 860 may be marked as dirty. If all inconsistent portions of the production bitmap 855 are marked as dirty, then the drives or volumes 810 and 820 may be considered to be consistent 1030. This may be because the inconsistent portion corresponds to a portion that is to be overwritten.

However, if after processing the read and writes, there are still inconsistencies, the volumes 810 and 820 may be considered to be inconsistent. The process may be stopped, the user may be notified, and/or corrective action may be taken. In the case no inconsistency is found, processing with the next portions of the volumes may continue. In an alternative embodiment, if inconsistencies exist, the inconsistent locations may be written to a persistent location and when the whole check completes only then all locations may be fixed together.

Referring now to FIGS. 15-19, in a particular embodiment of the current invention, it may be necessary to create a bitmap 1855 on the source 1802 and a bitmap 1860 target 1804 images 1500. Incoming IOs 1870 may be tracked on the source 1510 in bitmap 1855. As well, DO or UNDO Meta data 1804 may be marked on target bitmap 1870 and changes to the target may be tracked and IO from the do meta data stream may be read and marked 1520 in the bitmap 1860. Also if the remote image 1804 is moving to an old point in time, changes may be added to bitmap 1860. A chunk of the data may be read on the sources 1535.

A hash 1800 may be calculated for each of the chunks 1540 however dirty locations may be either not read and hashed or the hash may be marked as dirty. The hash 1800 on the source may be transmitted 1545 to the target 1804. The data may be read on the target site 1550. A remote hash 1801 may be calculated 1555. The hashes, 1800 and 1801, may be compared for the on-marked locations 1600.

If the hashes, 1800 and 1801, are identical 1610, then an acknowledgment may be sent to the source 1620. A check to see if all of both volumes 1810 and 1820 have been compared may be performed 1560. If all of both volumes 1810 and 1820 have been compared and they are consistent 1565, notice may be sent to the user 1570. If they are not consistent, another notification may be sent to the user 1580. As well, the process may stop or continue processing 1575.

Conversely, if the hashes 1800 and 1801 are not identical, the remaining IO 1840 may be flushed 1635 and the inconsistent block locations sent to the source site 1802. The source 1902 may flush 1650 all remaining IO 1970 and the bitmap 1955 may be further marked. If the inconsistent portion 1901 on the remote site is marked as dirty in the bitmap 1955, the comparison may have succeeded 1655. If there is still an inconsistency 1720, then a notification may be sent to the user that the drives 1810 and 1820 are inconsistent 1580. As well, the portion of the volume that may be inconsistent may be marked 1710 and the comparison may continue 1585. As well, in some cases, there may be a stop on the failure 1700.

The current techniques enable comparison of two drives or volumes, one of which may be a replicated version of the other, to ensure the drive have consistent data. This may occur although the drive, at any given time, may not be consistent in they are not at the same period of time. That is, they may have different amounts of IO pending. The current techniques may be applied to a drive, set of drives, array or arrays, volume or volumes. The underlying media is not important, although in certain embodiments the storage media may be presented to the current techniques as a contiguous volume. As well, the bitmaps used to compare the source and replication image may be any type of data structure into which a portion of the image can be imported and updated by the pending IO.

The methods and apparatus of this invention may take the form, at least partially, of program logic or code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine may be transformed into a special purpose digital machine.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for ensuring consistency of dynamically changing volumes comprising:
creating a production change map for at least part of a first volume; wherein the production change map is marked to represent pending IO to be applied to the at least a part of the first volume;
creating a replication change map for at least a part of a second volume; wherein the replication change map is marked to represent pending IO to be applied to the at least a part of the second volume;
calculating a first signature corresponding to a portion of the at least a part of the first volume; wherein the portion of the first volume selected for the calculation of the first signature is chosen to not include the portion marked as pending IO in the production change map;
transferring the first signature from the first volume to the second volume;
comparing the first signature to a second signature, the second signature corresponding to a portion of the at least a part of the second volume corresponding to the portion of the first volume; wherein portions marked as pending in the replication change map are not included in calculation of the second signature.

2. The method of claim 1 wherein the pending IO marked to the replication change map comprises IO from a DO Meta stream.

3. The method of claim 1 wherein the when the comparison of the first signature does not match the second signature, sending a non-matching portion of the second volume to the first volume.

4. The method of claim 3 wherein any additional pending IO is flushed to the production change map.

5. The method of claim 4 wherein the production change map is compared to the non-matching portion from the second volume.

6. The method of claim 1 wherein the production change map corresponds to the first volume and the replication change map corresponds to the second volume;
wherein the portion marked in the production change map corresponds to IO for the first volume; and
further wherein the portion marked in the replication change map corresponds to the IO for the the second volume.

7. The method of claim 3 wherein when the non-matching portion on the second volume does not correspond to pending IO on the first volume, stopping the comparison and sending a notification.

8. The method of claim 3 wherein when the non-matching portion on the second volume does not correspond to pending IO on the first volume, fixing the non-matching portion.

9. The method of claim 3 wherein the non-matching portion on the second volume does not correspond to pending IO on the first volume, storing the non-matching portion of the second volume in a store that does not match; and
after the comparison of the first volume to the second volume, requesting input from a user to determine to fix the non-matching portions;
based on a positive determination, fixing all the non-matching portions in the store.

10. A system for use in ensuring consistency of dynamically changing volumes, the system comprising:
a computer having a memory;
computer-executable program code operating in memory, wherein the computer-executable program code is configured for execution of the following steps:
creating a production change map for at least part of a first volume; wherein the production change map is marked to represent pending IO to be applied to the at least a part of the first volume;
creating a replication change map for at least a part of a second volume; wherein the replication change map is marked to represent pending IO to be applied to the at least a part of the second volume;
calculating a first signature corresponding to a portion of the at least a part of the first volume; wherein the portion of the first volume selected for the calculation of the first signature is chosen to not include the portion marked as pending IO in the production change map;
transferring the first signature from the first volume to the second volume;
comparing the first signature to a second signature, the second signature corresponding to a portion of the at least a part of the second volume corresponding to the portion of the first volume; wherein portions marked as pending in the replication change map are not included in calculation of the second signature.

11. The system of claim 10 wherein the pending IO marked to the replication change map comprises IO from a DO Meta stream.

12. The system of claim 10 wherein the when the comparison of the first signature does not match the second signature, send a non-matching portion of the second volume to the first volume.

13. The system of claim 12 wherein any additional pending IO is flushed to the production change map.

14. The system of claim 13 wherein the production change map is compared to the non-matching portion from the second volume.

15. The system of claim 10 wherein the production change map corresponds to the first volume and the replication change map corresponds to the second volume;
wherein the portion marked in the production change map corresponds to IO for the first volume; and
further wherein the portion marked in the replication change map corresponds to the IO for the the second volume.

16. A program product comprising:
a computer-readable storage medium encoded with computer-executable program code enabling:
computer-executable program code operating in memory, wherein the computer-executable program code is configured for execution of the following steps:
creating a production change map for at least part of a first volume; wherein the production change map is marked to represent pending IO to be applied to the at least a part of the first volume;
creating a replication change map for at least a part of a second volume; wherein the replication change map is marked to represent pending IO to be applied to the at least a part of the second volume;
calculating a first signature corresponding to a portion of the at least a part of the first volume; wherein the portion of the first volume selected for the calculation of the first signature is chosen to not include the portion marked as pending IO in the production change map;
transferring the first signature from the first volume to the second volume;
comparing the first signature to a second signature, the second signature corresponding to a portion of the at least a part of the second volume corresponding to the portion of the first volume; wherein portions marked as pending in the replication change map are not included in calculation of the second signature.

17. The program product of claim 16 wherein the pending IO marked to the replication change map comprises IO from a DO Meta stream.

18. The program product of claim 16 wherein the when the comparison of the first signature does not match the second signature, send a non-matching portion of the second volume to the first volume.

19. The program product of claim 17 wherein any additional pending IO is flushed to the production change map.

20. The program product of claim 16 wherein the production change map corresponds to a portion of the first volume and the replication change map corresponds to a portion of the second volume;
- wherein the IO marked in the production change map corresponds to the IO for the portion of the first volume; and
- further wherein the IO marked in the replication change map corresponds to the IO for the portion of the second volume.

* * * * *